United States Patent [19]
Woodruff et al.

[11] Patent Number: 5,948,982
[45] Date of Patent: Sep. 7, 1999

[54] VIBRATING BEAM ACCELEROMETERS AND METHODS OF FORMING VIBRATING BEAM ACCELEROMETERS

[75] Inventors: James R. Woodruff; Ronald B. Leonardson, both of Redmond, Wash.

[73] Assignee: AlliedSignal Inc., Morristown, N.J.

[21] Appl. No.: 09/028,152

[22] Filed: Feb. 23, 1998

[51] Int. Cl.$^6$ .................................................. G01P 15/08
[52] U.S. Cl. ........................................................ 73/514.29
[58] Field of Search ........................... 73/514.29, 862.59; 73/DIG. 1; 216/2

[56] References Cited

U.S. PATENT DOCUMENTS

| | | | |
|---|---|---|---|
| 3,221,256 | 11/1965 | Walden | 328/1 |
| 4,030,347 | 6/1977 | Norris et al. | 78/88.5 R |
| 4,035,675 | 7/1977 | Malocha et al. | 310/9.8 |
| 4,200,849 | 4/1980 | Malocha | 333/194 |
| 4,215,570 | 8/1980 | Eer Nisse | 73/141 |
| 4,372,173 | 2/1983 | Eer Nisse et al. | 73/862 |
| 4,384,264 | 5/1983 | Kadota | 333/193 |
| 4,499,393 | 2/1985 | Stokes et al. | 310/313 |
| 4,573,357 | 3/1986 | Meunier | 73/517 |
| 4,676,104 | 6/1987 | Cullen | 73/516 |
| 4,699,006 | 10/1987 | Boxenhorn | 73/517 |
| 4,872,342 | 10/1989 | Hanson et al. | 73/514.29 |
| 4,891,982 | 1/1990 | Norling | 73/497 |
| 4,901,586 | 2/1990 | Blake et al. | 73/514.29 |
| 5,005,413 | 4/1991 | Novak et al. | 73/514.29 |
| 5,020,370 | 6/1991 | Deval et al. | 73/514.29 |
| 5,025,346 | 6/1991 | Tang et al. | 361/283 |
| 5,136,266 | 8/1992 | Niitsuma | 333/154 |
| 5,186,053 | 2/1993 | Egley et al. | 73/497 |
| 5,186,844 | 2/1993 | Burd et al. | 210/782 |
| 5,304,965 | 4/1994 | Manner | 333/194 |
| 5,349,855 | 9/1994 | Bernstein | 73/505 |
| 5,365,138 | 11/1994 | Saw et al. | 310/313 |
| 5,367,217 | 11/1994 | Norling | 73/862.59 |
| 5,392,650 | 2/1995 | O'Brian et al. | 73/517 |
| 5,396,200 | 3/1995 | Machui | 333/196 |
| 5,485,051 | 1/1996 | Tera | 310/313 B |
| 5,491,604 | 2/1996 | Nguyen et al. | 361/278 |
| 5,495,761 | 3/1996 | Diem et al. | 73/514.32 |
| 5,496,436 | 3/1996 | Bernstein et al. | 156/628.1 |
| 5,500,549 | 3/1996 | Takeuchi et al. | 257/415 |
| 5,501,103 | 3/1996 | Woodruff et al. | 73/514.29 |
| 5,553,506 | 9/1996 | Benz et al. | 73/862.59 |
| 5,594,170 | 1/1997 | Peters . | |

FOREIGN PATENT DOCUMENTS 44 24 635 A 1   1/1996   Germany .

OTHER PUBLICATIONS

"Independent Tuning Of The Linear And Nonlinear Stiffness Coefficients Of A Micromechanical Device", Scott G. Adams et al, 1996, Conference: Proceedings of Ninth International Workshop on Micro Electromechanical Systems, Feb. 11–15, 1996, pp. 32–37.

"Vibrating Structure Gyroscope", British Aerospace Ltd., 1994.

"Silicon Resonant Angular Rate Sensor Using Electromagnetic Excitation And Capacitive Detection", M. Hashimoto et al., *J. Micromech. Micro eng.* 5 (1995) 219–225.

Laminated High–Aspect–Ratio Microstructures In A Conventional CMOS Process, G.K. Fedder, et al., 1996 IEEE, pp. 13–18.

(List continued on next page.)

*Primary Examiner*—John E. Chapman

[57] ABSTRACT

Accelerometers and methods of forming accelerometers are described. The accelerometers are provided with electrically conductive structure configured for connection with external circuitry. The electrically conductive structure has a folded-back architecture which reduces temperature-induced anomalies which can adversely impact acceleration-sensing function of the accelerometer.

31 Claims, 12 Drawing Sheets

OTHER PUBLICATIONS

"Vibrating Beam Accelerometers", Chapter 5, 1984, Modern Inertial Technology, pp. 72–83.

"Polycrystalline Silicon Carbide For Surface Micromachining", A.J. Fleischman et al, 1996 IEEE, pp. 234–238.

"Electroplated Thick CoNiMnP Permanent Magnet Arrays For Micromachined Magnetic Device Applications", Trifon Liakopoulos et al, 1996 IEEE, pp. 79–84.

"Coriolis Rate Gyros (CRG)", L. W. Richardson, 1994 IEEE.

"Integrating SCREAM Micromachined Devices With Integrated Circuits", Kevin A. Shaw et al, 1996 IEEE, pp. 44–48.

"Mechanical Properties Of Thick, Surface Micromachined Polysilicon Films", H. Khan et al, 1996 IEEE, pp. 343–348.

"A Micromachined Comb–Drive Tuning Fork Rate Gyroscrope", Dr. Marc Weinberg et al, C.S. Draper Laboratory, pp. 595–601. (undated)

"Micromachined Gyroscopes", Jan Söderkvist, Sensors and Actuators A, 43 (1994) pp. 65–71.

"Initial Results On Micromachined Comb Drive Gyroscope With EDM2 Electronics", M. Weinberg et al, 1993 C.S. Draper Laboratory. "A Microactuator System For The Study And Control Of Screech In High Speed Jets", Chunchieh Huang et al, 1996 IEEE, pp. 19–24.

"Transverse Mode Electronic Microactuator For Mems–Based HDD Slider", Takahiro Imamura et al, 1996 IEEE, pp. 216–221.

"Electrostatically Balanced Comb Drive For Controlled Levitation", William Tang, 1990, Technical Digest, IEEE Solid–State Sensor and Actuator Workshop, pp. 23–27.

"Electrostatic Comb Drive Levitation And Control Method", William Tang et al, *Journal of Microelectromechanical Systems*, vol. 1, No. 4, Dec. 1992, pp. 170–178.

"A Navigation Grade Micro–Machined Silicon Accelerometer", Mark Helsel et al, 1994 IEEE, pp. 51–58.

"Electrostatic Comb Drive Of Lateral Polysilicon Resonators", William Tang et al, 1990, *Sensors and Actuators* A (Physical), vol. A21, No. 1–3, pp. 328–331.-

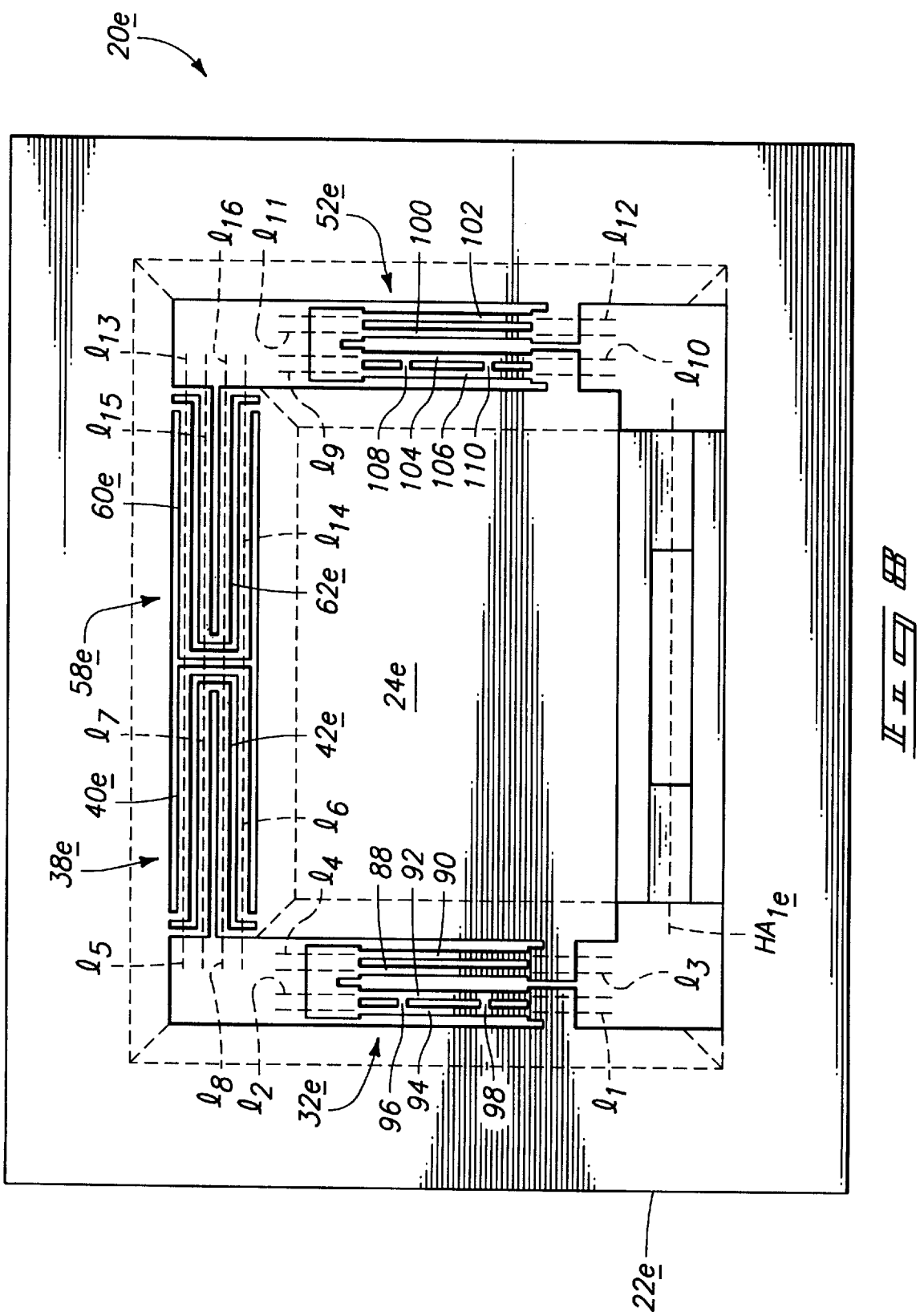

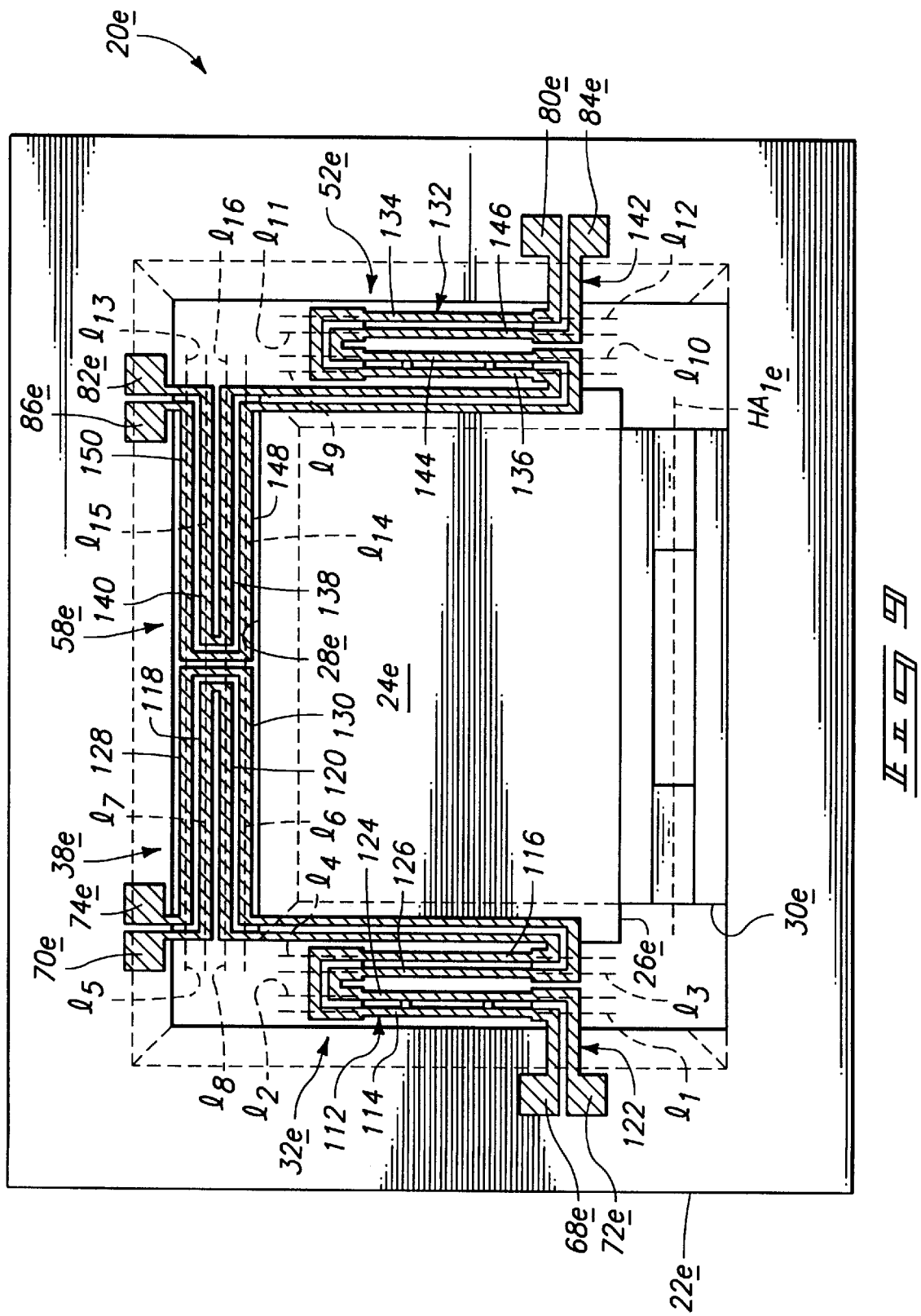

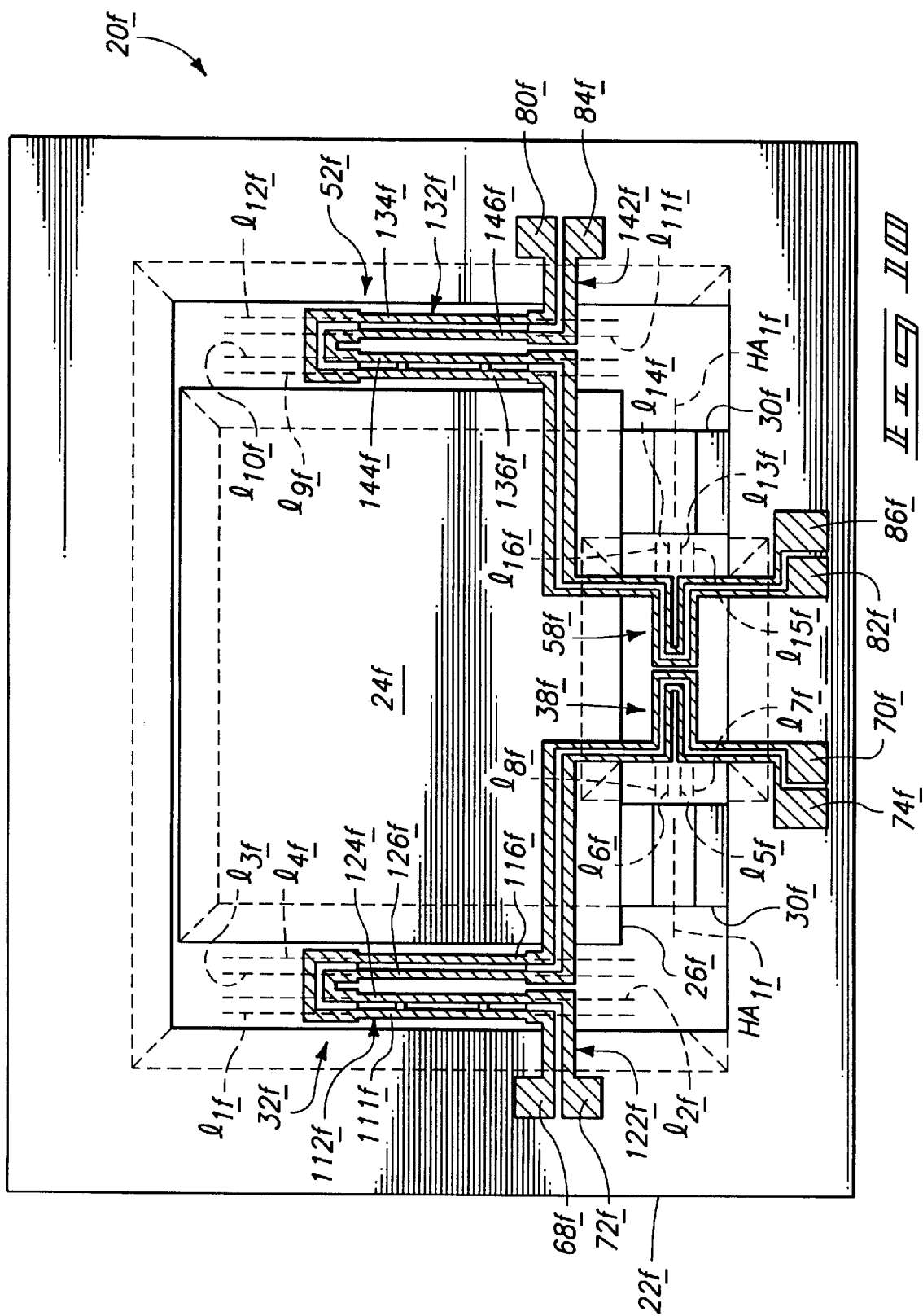

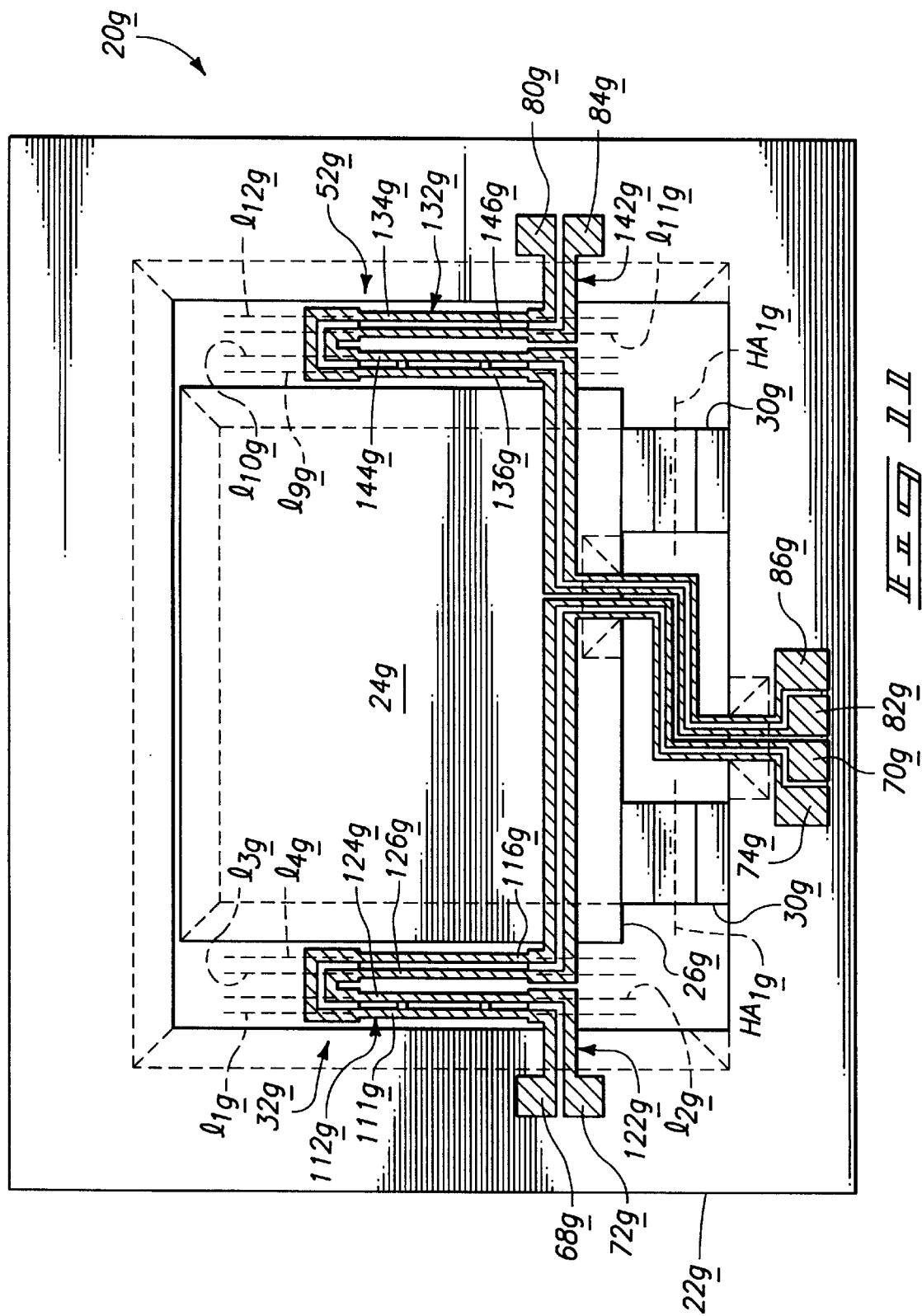

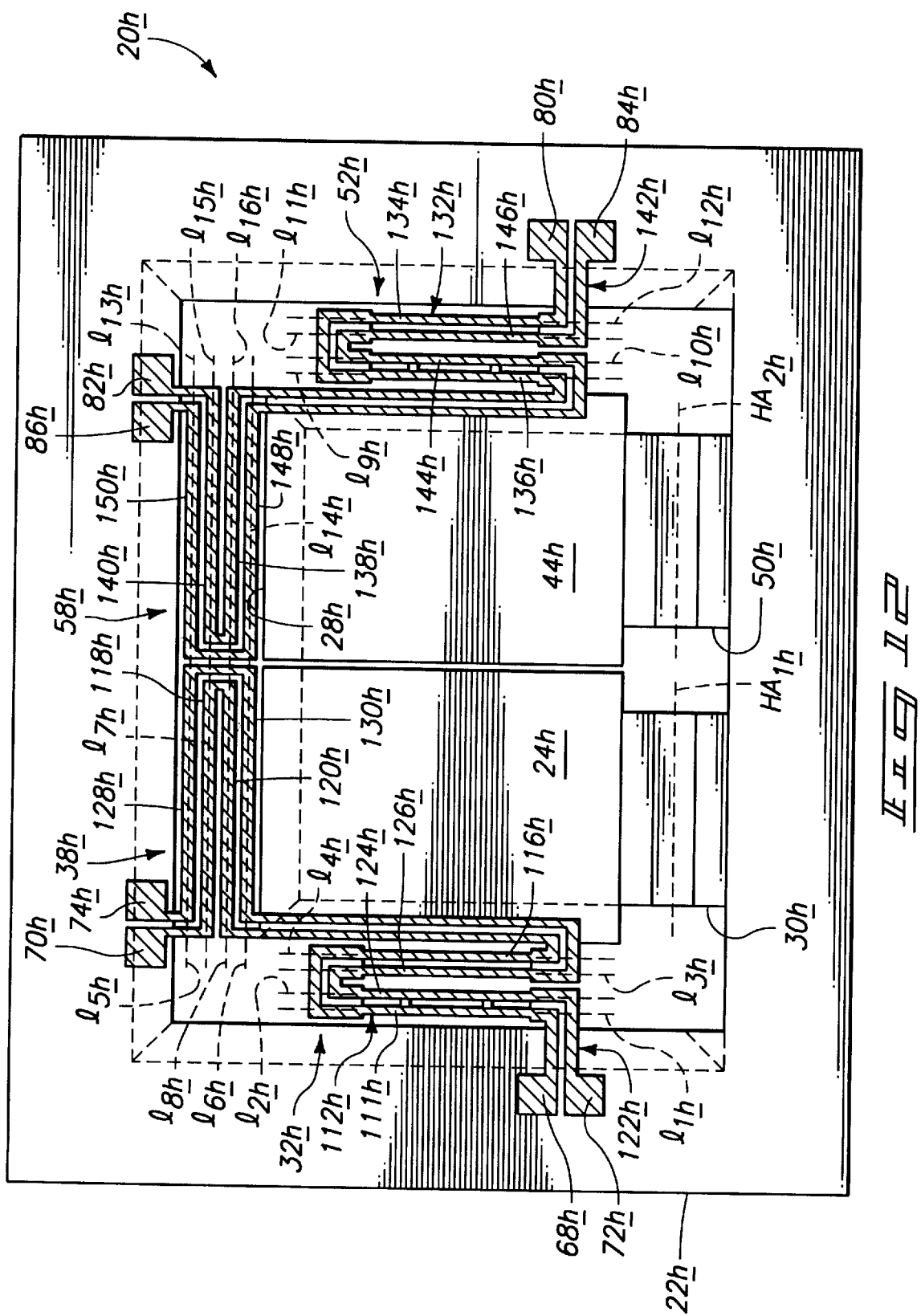

VIBRATING BEAM ACCELEROMETERS AND METHODS OF FORMING VIBRATING BEAM ACCELEROMETERS

TECHNICAL FIELD

The present invention relates to accelerometers and methods of forming the same. In particular, the invention relates to vibrating beam accelerometers and methods of forming the same.

BACKGROUND OF THE INVENTION

Vibrating beam accelerometers are generally known in the art. Exemplary accelerometers and/or component parts such as force sensors for use with accelerometers are disclosed in U.S. Pat. Nos. 5,339,698, 5,501,103, 5,456,110, 5,450,762, 5,331,242, 5,367,217, and 5,456,111, the disclosures of which are expressly incorporated herein by reference.

A typical vibrating beam accelerometer can be etched from a silicon wafer using micromachining techniques which are generally known. The vibrating beam or beams of such accelerometers are used to form one or more resonators which control the frequency of one or more oscillator circuits. The vibrating beam or beams are generally connected between a frame and one or more proof masses and are configured so that an acceleration results in a tension or compression force along the beam or beams. Accordingly, changes in the resonant frequency of the beams occur and exemplary signals from the oscillators are then frequency modulated which indicates acceleration.

For additional background material on accelerometers, and in particular vibrating beam accelerometers, the reader is referred to a text by Anthony Lawrence entitled, *Modern Inertial Technology-Navigation, Guidance, and Control*, the disclosure of which is expressly incorporated herein by reference.

Some accelerometers can be formed in crystalline quartz. Such quartz possesses piezoelectric properties which can be utilized in connection with one or more vibrating beams to measure acceleration. Unlike crystalline quartz however, silicon is not piezoelectric. Accordingly, piezoelectric drive cannot be used or incorporated into a silicon-based system for measuring acceleration. One practical drive method suitable for use with silicon-based systems is electromagnetic drive. For electromagnetic drive, the vibrating beam or beams are placed in a magnetic field. Electrical current passed over or through the beam or beams exerts a force on the beams while the motion of the beam or beams in the magnetic field generates an electrical voltage. The resistivity of silicon, however, makes it impractical to use the conductivity of silicon to conduct the appropriate electrical current. One past solution has been to form or provide a layer of conductive material having a sufficiently low resistance over the beam or beams. An exemplary material is gold which can be readily patterned to have separate conductive layers on the different beams of the accelerometer. U.S. Pat. No. 5,501,103 incorporated by reference above describes such solutions. One particular drive circuit configuration requires electrical leads, in addition to those on the force sensing beams, between the proof mass and the frame. Separate silicon beams or struts having a metal disposed over an oxide have been used for this purpose.

One problem associated with the use of a metal layer over the vibrating beams or struts is that the metal material undergoes irreversible changes with temperature variations. As a result, changes in frequency which are not a true indication of the acceleration can be experienced by the proof mass. The exemplary gold material mentioned above exhibits this problem. While other metals and combinations of metals have been tried, none have resulted in sufficiently stable frequency over operating temperature ranges.

FIG. 1 shows a silicon micromachined vibrating beam accelerometer generally at 20. The accelerometer comprises a frame 22 and a first proof mass 24. Proof mass 24 includes a mounted end 26 and a distal end 28 away from or opposite mounted end 26. A flexure 30 is provided and extends between mounted end 26 and frame 22. As used in the context of this document, "flexure" will be understood to mean one or more flexure portions which are joined with a proof mass. Flexure 30 defines a hinge axis $HA_1$ about which proof mass 24 can be moved in relation to an acceleration experienced by accelerometer 20 along an input or sensitive axis which is generally into the plane of the page upon which FIG. 1 appears. A vibrating beam assembly 32 is connected between frame 22 and proof mass 24. Assembly 32 includes a pair of vibratable beams 34, 36. A strut assembly 38 is provided and is connected between frame 22 and proof mass 24. Strut assembly 38 includes individual struts 40, 42.

In the illustrated example, a second proof mass 44 is provided and includes a mounted end 46 and a distal end 48 away from or opposite mounted end 46. A flexure 50 is provided and is connected between mounted end 46 and frame 22. Flexure 50 defines a hinge axis $HA_2$ about which second proof mass 44 can be moved in relation to an experienced acceleration. A vibrating beam assembly 52 is provided and is connected between frame 22 and proof mass 44. Vibrating beam assembly 52 includes individual vibratable beams 54, 56. A strut assembly 58 is provided and connected between frame 22 and proof mass 44. Strut assembly 58 includes individual struts 60, 62.

Accelerometer 20 is etched from a wafer of silicon crystal with surfaces disposed in the 1,0,0 crystal planes. The accelerometer in practice is mounted directly or indirectly to a vehicle the acceleration of which is to be measured. Frame 22 and proof masses 24, 44 typically have thicknesses (into the plane of the page upon which FIG. 1 appears) which are generally comparable to the thickness of a silicon wafer, i.e., typically around 400 to 525 microns. Flexures 30, 50 have respective transition areas 29, 31, and 49, 51 which extend toward a central portion of each flexure which has a thickness of around 20 microns. In the illustrated example, vibrating beam assemblies 32, 52 comprise double ended tuning forks with respective end parts 35, 55 providing for good mechanical coupling of the vibrating beams.

FIG. 2 shows electrically conductive structure disposed over vibrating beam assemblies 32, 52, proof masses 24, 44, and strut assemblies 38, 58. The conductive material defines first and second conductive paths 64, 66 which extend between respective pairs of bond pads 68, 70 and 72, 74. Third and fourth conductive paths 76, 78 are provided and extend over vibrating beam assembly 52, proof mass 44, and strut assembly 58 as shown. Conductive paths 76, 78 extend between respective pairs of bond pads 80, 82, and 84, 86. An exemplary conductive material comprising the conductive structure defining paths 64, 66, 76, and 78 is gold which can be provided to a thickness of around 0.5 microns and which can be separated from the underlying silicon by a layer of silicon oxide which is typically 0.5 microns thick.

Vibrating beam assemblies 32, 52 are arranged so that an acceleration causes a tension force on one of the assemblies and a compression force on the other of the assemblies. A difference in frequencies between the vibrating beam assemblies provides an indication of acceleration. The electrically conductive structure defining the conductive paths, and in particular bond pads 68, 70, 72, 74, 80, 82, 84, and 86 are used to couple the vibrating beam assemblies with which each is associated to an external oscillator circuit. In the illustrated example in FIG. 2, first conductive path 64 is provided over one vibrating beam and one strut, and second conductive path 66 is provided over the other vibrating beam and the other strut. Similarly, third conductive path 76 is provided over one vibrating beam and one strut while fourth conductive path 78 is provided over the other vibrating beam and other strut. One of the vibrating beams for each proof mass is driven by a current, while motion of the other beam produces a voltage. Mechanical coupling between the vibrating beams of each beam assembly makes it possible to drive one beam and sense the motion of the other. In the illustrated example, hinge axes $HA_1$ and $HA_2$ are disposed on a common side of frame 22.

FIG. 3 shows an alternate accelerometer design. Like numerals from the above-described embodiment have been utilized with the suffix "a". In this example, proof mass 44a is rotated 180° from that shown in FIGS. 1 and 2. Accordingly, the respective hinge axes of the proof masses are now disposed on different or opposite sides of frame 22a. This configuration has been found to have advantages which relate to near perpendicular alignment of the combined sensitive axes of the proof masses with the front and back surfaces of the accelerometer.

FIG. 4 shows an alternate accelerometer design. Like numerals from the above-described embodiment have been utilized with the suffix "b". In this example, there is no strut assembly connected to proof masses 24b, 44b and frame 22b. The conductive structure which forms conductive paths 64b, 76b over the vibrating beam assemblies of each proof mass are connected together at each respective proof mass end. The equivalent circuit of this configuration with the vibrating beams immersed in a magnetic field is a resistor, an inductor, and a capacitor connected in parallel.

FIGS. 5 and 6 show an accelerometer 20c which utilizes only one proof mass 24c and includes a pair of vibrating beam assemblies and strut assemblies.

FIG. 7 shows an embodiment which utilizes only one proof mass 24d and no strut assembly. Additionally, the conductive structure is connected together at the proof mass end as in FIG. 4.

The implementations described just above are susceptible to temperature-induced effects which can cause inaccuracies in the sensed acceleration of each proof mass. Specifically, temperature changes can cause the conductive structure defining each of the conductive paths over the accelerometer to expand and contract differently than silicon. This causes a change in length of the conductive structure which does not match the dimensional change in the remaining silicon structure. Accordingly, a force is generated on the vibrating beam assemblies, the strut assemblies (where incorporated into a particular design), and the associated proof mass or masses. Over extended temperature ranges, for example from −40° C. to 100° C., the metal or conductive structure undergoes irreversible changes so that even if the accelerometer is calibrated over several temperatures and corrections are made for temperature effects, the irreversible changes still cause errors. Similarity of the errors in the vibrating beam assemblies can result in less error in the frequency difference, but the error is still too great for some applications.

This invention arose out of concerns associated with providing accelerometers and methods of forming the accelerometers which are directed to solving problems associated with temperature changes and the effects such changes have on the corresponding structure of accelerometers.

SUMMARY OF THE INVENTION

Accelerometers and methods of forming accelerometers are described. In one implementation, an accelerometer includes a frame, a proof mass, a flexure connected between the frame and the proof mass and defining a hinge axis about which the proof mass can be moved. A vibrating beam assembly is provided and connected between the frame and the proof mass. In one aspect, a strut assembly is provided and connected between the frame and the proof mass. Electrically conductive structure is supported over the vibrating beam assembly and the strut assembly and configured for connection to an external electrical circuit. The electrically conductive structure defines a first conductive path having two pairs of first conductive path portions. One of the pair of first conductive path portions is supported over the vibrating beam assembly and extends along individual lines which define a first set of lines which are generally parallel with one another. The other of the pair of first conductive path portions is supported over the strut assembly and extends along individual lines which define a second set of lines which are generally parallel with one another. The electrically conductive structure further defines a second conductive path having two pairs of second conductive path portions. One of the pair of second conductive path portions is supported over the vibrating beam assembly and extends along individual lines which define a third set of lines which are generally parallel with one another. The other of the pair of second conductive path portions is supported over the strut assembly and extends along individual lines which define a fourth set of lines which are generally parallel with one another.

BRIEF DESCRIPTION OF THE DRAWINGS

FIG. 8 is a top plan view of an accelerometer in accordance with one implementation of the present invention.

FIG. 9 is a top plan view of the FIG. 8 accelerometer with electrically conductive structure disposed thereon.

FIG. 10 is a top plan view of an accelerometer in accordance with another implementation of the present invention.

FIG. 11 is a top plan view of an accelerometer in accordance with another implementation of the present invention.

FIG. 12 is a top plan view of an accelerometer in accordance with another implementation of the present invention.

DETAILED DESCRIPTION OF THE PREFERRED EMBODIMENTS

Figure 1:
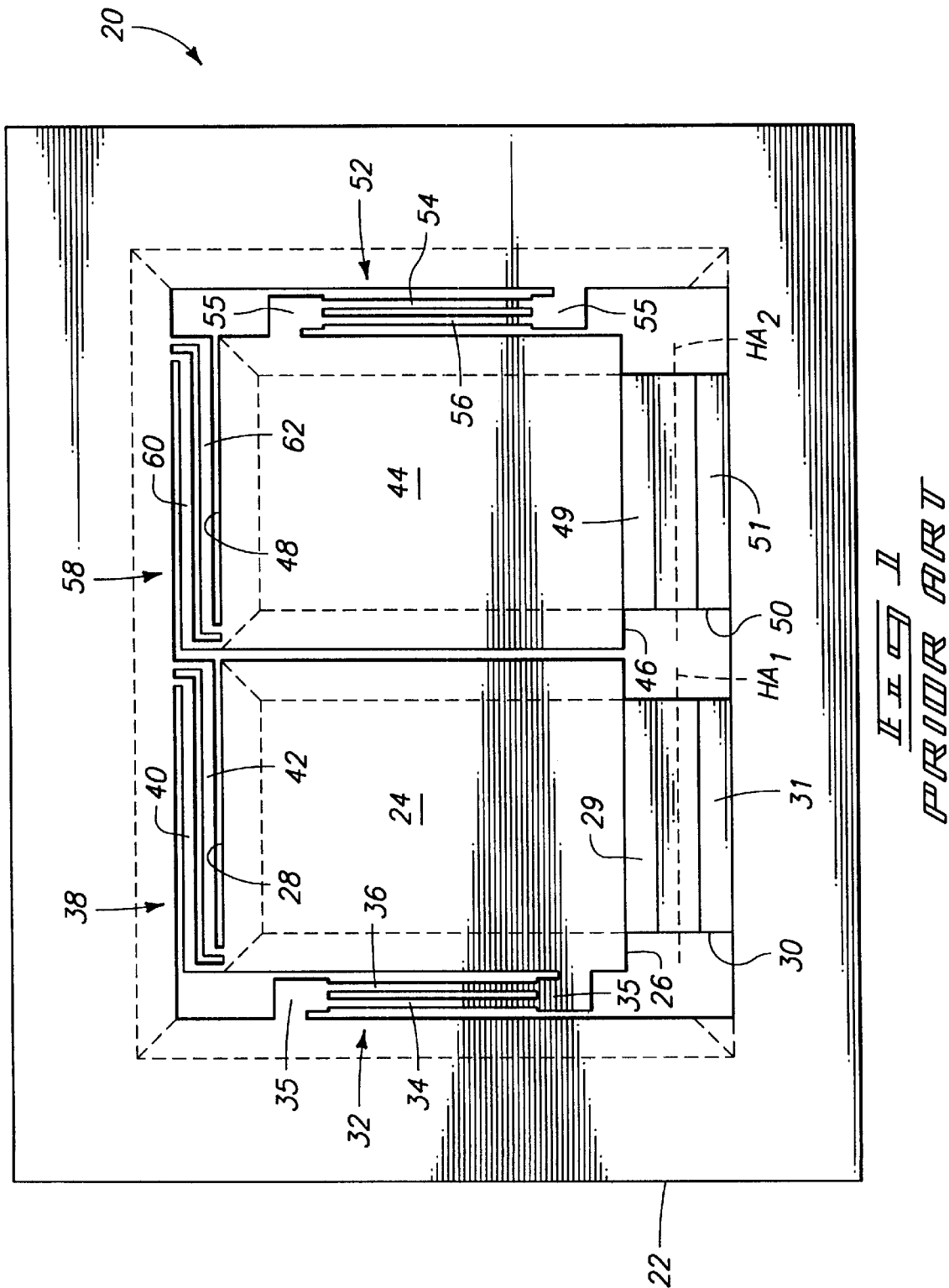
FIG. 1 is a top plan view of a known accelerometer.
Figure 2:
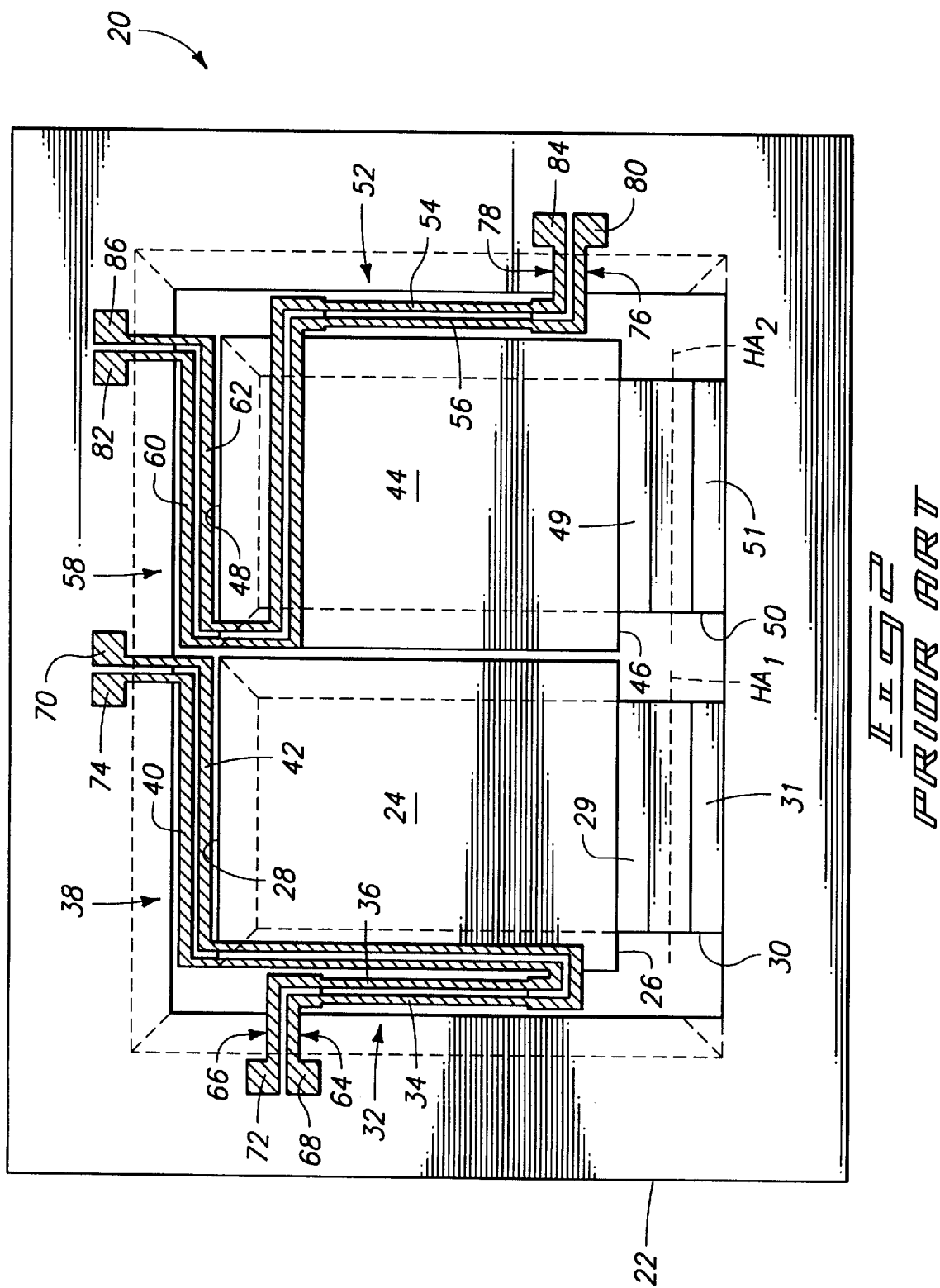
FIG. 2 is a top plan view of the FIG. 1 accelerometer with electrically conductive structure disposed thereon.

FIGS. 8 and 9 show an accelerometer in accordance with a first implementation of the invention generally at 20e. Like numerals from the above-described accelerometers have been utilized with the suffix "e". Differences are indicated with different numerals or letters. Accordingly, accelerometer 20e includes vibrating beam assemblies 32e, 52e. Accelerometer 20e also includes strut assemblies 38e, 58e. The beam assemblies and strut assemblies are connected between frame 22e and proof mass 24e. Vibrating beam assembly 32e comprises a pair of vibratable beams 88, 90, and a pair of generally non-vibratable beams 92, 94. Non-vibratable beams 92, 94 are tied together with a pair of cross pieces 96, 98. The beams comprising vibrating beam assembly 32e are generally elongate and are formed along individual longitudinal axes defining lines $l_1$, $l_2$, $l_3$, and $l_4$. Specifically, beam 94 is formed along line $l_1$, beam 92 is formed along line $l_2$, beam 88 is formed along line $l_3$, and beam 90 is formed along line $l_4$. In the illustrated example, the lines are generally parallel with one another.

Strut assembly 38e includes first and second struts 40e and 42e. Strut 40e is generally elongate and formed along a longitudinal axis which defines a pair of lines $l_5$, $l_6$ which are generally parallel with one another. Strut 42e is generally elongate and formed along a longitudinal axis which defines a pair of lines $l_7$, $l_8$ which are generally parallel with one another. Each individual strut of the pair of struts include strut portions which extend from the proof mass along the associated longitudinal axis and to the frame in directions which are generally opposite one another. For example, first strut 40e includes a pair first strut portions which correspond to those portions of the strut which are formed along lines $l_5$, $l_6$ respectively. As one proceeds along strut 40e from proof mass 24e to frame 22e, the strut is seen to extend in a first direction (to the right as viewed in FIG. 8 and generally parallel with the hinge axis) along line $l_6$. The strut then bends and extends in a second direction away from line $l_6$ and toward line $l_5$. The strut then bends again to extend in a third direction (to the left as viewed in FIG. 8) along line $l_5$ and finally connects with the frame. The first and third directions are generally opposite one another. The path just described can be considered as a folded path in which the strut is folded back on itself to define the opposing directions. Similarly, second strut 42e includes third and fourth strut portions which extend in generally opposite directions and which correspond with lines $l_7$, $l_8$.

Vibrating beam assembly 52e includes vibratable beams 100, 102, and generally non-vibratable beams 104, 106. The beams of vibrating beam assembly 52e are generally elongate and formed along individual longitudinal axes which define lines $l_9$, $l_{10}$, $l_1$, and $l_{12}$. Specifically, beam 106 is formed along line $l_9$, beam 104 is formed along line $l_{10}$, beam 100 is formed along line $l_{11}$, and beam 102 is formed along line $l_{12}$. Non-vibratable beams 104, 106 are tied together with a pair of cross pieces 108, 110.

Strut assembly 58e includes a pair of generally elongate first and second struts 60e, 62e. Strut 60e is formed along a longitudinal axis which defines lines $l_{13}$, $l_{14}$ which are generally parallel with one another. Strut 62e is formed along a longitudinal axis which defines lines $l_{15}$, $l_{16}$ which are generally parallel with one another. The individual struts of the pair of struts include respective strut portions which extend from the proof mass along the associated longitudinal axis and to the frame in directions which are generally opposite one another as described above in connection with strut assembly 38e.

FIG. 9 shows electrically conductive structure which has been formed over vibrating beam assemblies 32e, 52e, and strut assemblies 38e, 58e. A first conductive path 112 is defined by the electrically conductive structure and extends over vibrating beam assembly 32e and strut assembly 38e between a pair of spaced-apart first bond pads 68e, 70e. First conductive path 112 includes two pairs of first conductive path portions, with one of the pair being supported over vibrating beam assembly 32e, and the other of the pair being supported over strut assembly 38e. Specifically, first conductive path portions 114, 116 are disposed over and supported by beams 94, 90 (FIG. 8) of vibrating beam assembly 32e and extend along lines $l_1$, $l_4$ respectively. Accordingly, lines $l_1$, $l_4$ define a first set of lines which are generally parallel with one another. A pair of first conductive path portions, 118, 120 are supported over common strut 42e (FIG. 8) of strut assembly 38e and constitute the other of the pair of conductive path portions. Path portions 118, 120 extend along lines $l_7$, $l_8$ with such lines defining a second set of lines which are generally parallel with one another.

The electrically conductive structure further defines a second conductive path 122 having two pairs of second conductive path portions, one of which being disposed over and supported by vibrating beam assembly 32e, the other of which being disposed over and supported by strut assembly 38e. The second conductive path extends between a pair of spaced-apart second bonds pads 72e, 74e. Specifically, second conductive path portions 124, 126 are supported over beams 92, 88 (FIG. 8) respectively. Accordingly, such conductive path portions are formed along individual lines $l_2$, $l_3$ which define a third set of lines which are generally parallel with one another. A pair of second path portions 128, 130 are provided over common strut 40e (FIG. 8) and are formed along lines $l_5$, $l_6$. Path portions 128, 130 constitute the other of the pair of second conductive path portions which are supported over strut assembly 38e. Lines $l_5$, $l_6$ constitute a fourth set of lines which are generally parallel with one another.

The electrically conductive structure further defines a third conductive path 132 having two pairs of third conductive path portions, one of the pair being supported over vibrating beam assembly 52e, the other of the pair being supported over strut assembly 58e. The third conductive path extends between a pair of spaced-apart third bond pads 80e, 82e. Specifically, third conductive path portions 134, 136 are supported over beams 102, 106 (FIG. 8) respectively. Accordingly, path portions 134, 136 extend along lines $l_{12}$, $l_9$ respectively. Lines $l_{12}$, $l_9$ comprise a fifth set of lines which are generally parallel with one another. A pair of third conductive path portions 138, 140 are supported over strut 62e (FIG. 8). Path portions 138, 140 constitute the other of the pair of third conductive path portions and are formed along lines $l_{16}$, $l_{15}$ respectively. Accordingly, lines $l_{16}$, $l_{15}$ constitute a sixth set of lines which are generally parallel with one another.

The electrically conductive structure further defines a fourth conductive path 142 having two pairs of fourth conductive path portions, one pair of which being supported over vibrating beam assembly 52e, the other pair of which being supported over strut assembly 58e. The fourth conductive path extends between a pair of spaced-apart fourth bond pads 84e, 86e. Specifically, a pair of fourth conductive path portions 144, 146 are disposed over beams 104, 100 (FIG. 8) respectively, and accordingly along lines $l_{10}$, $l_{11}$. Lines $l_{10}$, $l_{11}$ constitute a seventh set of lines which are generally parallel with one another. Fourth path portions 148, 150 are supported over common strut 60e of strut assembly 52e and constitute the other of the pair of fourth conductive path portions. Such path portions are formed along lines $l_{14}$, $l_{13}$, with such lines constituting an eighth set of lines which are generally parallel with one another.

In the illustrated example, both strut assemblies 38e, 58e are disposed intermediate distal end 28e of the proof mass and frame 22e. Additionally, first set of lines $l_1$, $l_4$ are generally parallel with third set of lines $l_2$, $l_3$. Further, second set of lines $l_7$, $l_8$ are generally parallel with fourth set of lines $l_5$, $l_6$. Also, the first set of lines $l_1$, $l_4$ are generally perpendicular to second set of lines $l_7$, $l_8$; and third set of lines $l_2$, $l_3$ are generally perpendicular to the fourth set of lines $l_5$, $l_6$. Other positional relationships between the struts and the beams are evident in this embodiment. For example, the first, third, fifth, and seventh sets of lines mentioned above are generally parallel with one another. Additionally, the second, fourth, sixth, and eighth sets of lines mentioned above are generally parallel with one another.

The above-described construction has advantages over the previously-described embodiments in that any temperature-induced bending or deformation exerts an order of magnitude less force between the frame and the proof mass, and an order of magnitude less force on the vibrating beam assemblies and strut assemblies. In addition, this embodiment constitutes one in which. the electrically conductive structure which is formed over the beams and struts is folded back on itself over both the beams and the struts. It is possible, however, for the beams and/or struts to be configured so that the electrically conductive structure folds back over only either the beams or the struts, but not both. Moreover, it is possible for the struts to be eliminated all together from the construction such that only the beam assemblies provide the desired folded-back architecture. In this illustrated example, the conductive bond pads with which each conductive path is connected are supported over the frame on one side of hinge axis $HA_{1e}$.

FIG. 10 shows an alternate embodiment of an accelerometer generally at 20f. Like numbers from the above-described embodiment have been utilized with the suffix "f". Strut assemblies 38f, 58f are disposed intermediate mounted end 26f of proof mass 24f and frame 22f. Accordingly, the strut assemblies are disposed proximate flexure 30f. By locating the strut assemblies near the effective center of rotation of proof mass 24f, stiffening of the proof mass by the struts is diminished by a factor of 2 or more. Additionally, any force exerted by the struts on the proof mass as a result of temperature changes are diminished. In this example, the respective bond pads with which each conductive path is connected are disposed on different or opposite sides of hinge axis $HA_{1f}$.

FIG. 11 shows an embodiment in which the strut assemblies are disposed intermediate mounted end 26g of proof mass 24g and frame 22g. Like numerals have been used with the suffix "g". The strut assemblies do not, in this embodiment, have the folded-back architecture of the above strut assembly. Accordingly, the folded-back architecture is provided by vibrating beam assemblies 32g, 52g.

Figure 3:
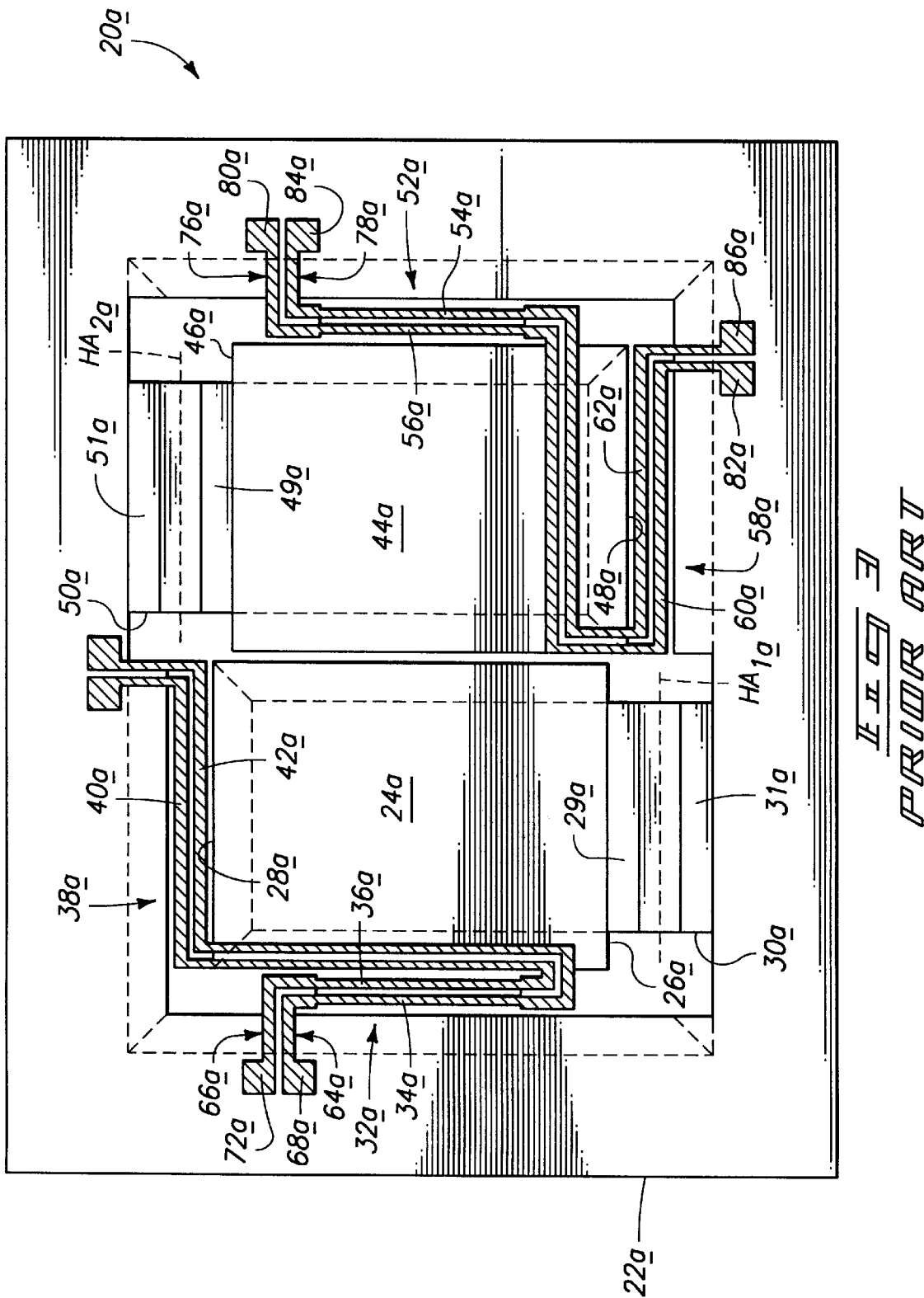
FIG. 3 is a top plan view of another known accelerometer.
Figure 4:
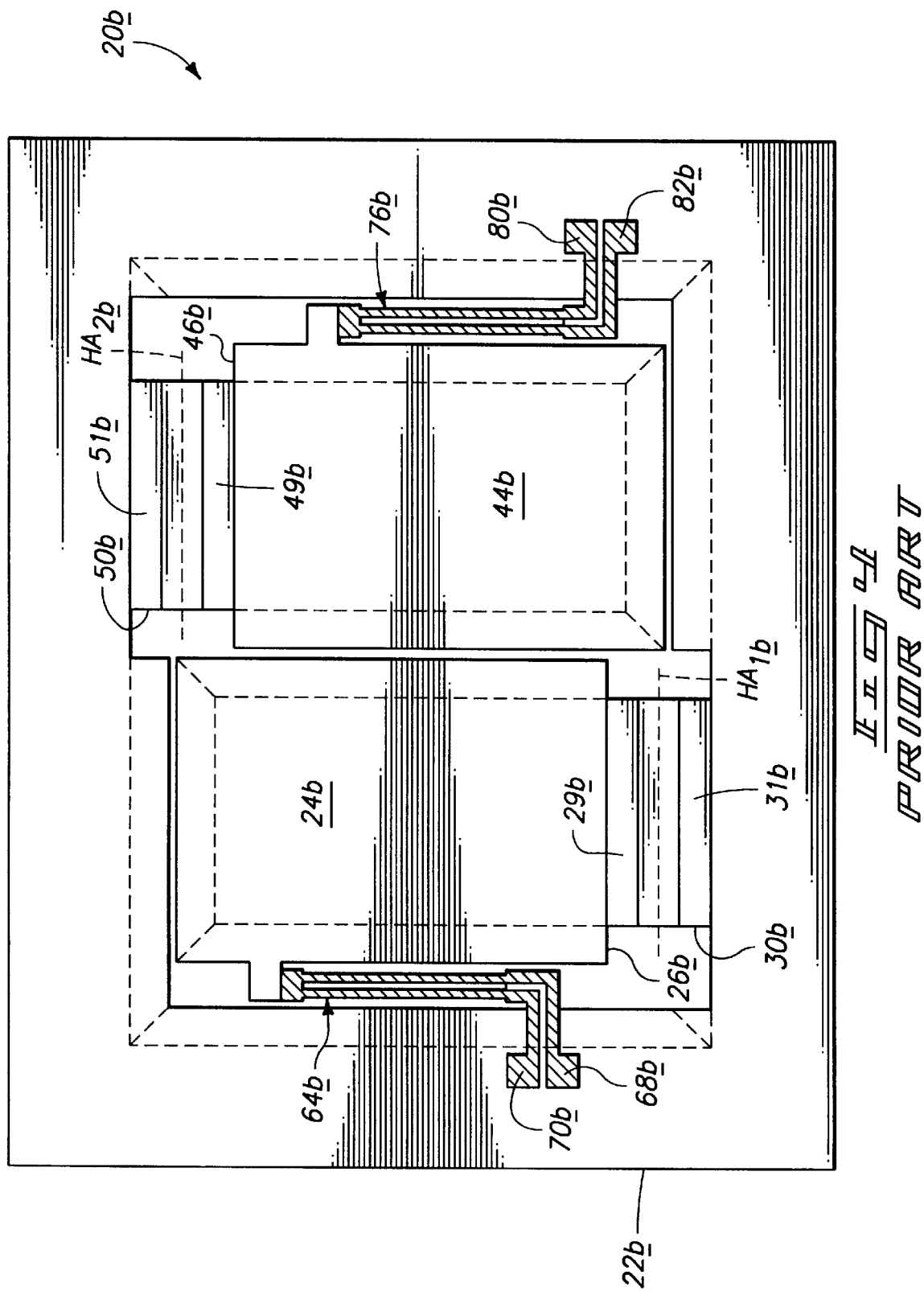
FIG. 4 is a top plan view of another known accelerometer.
Figure 5:
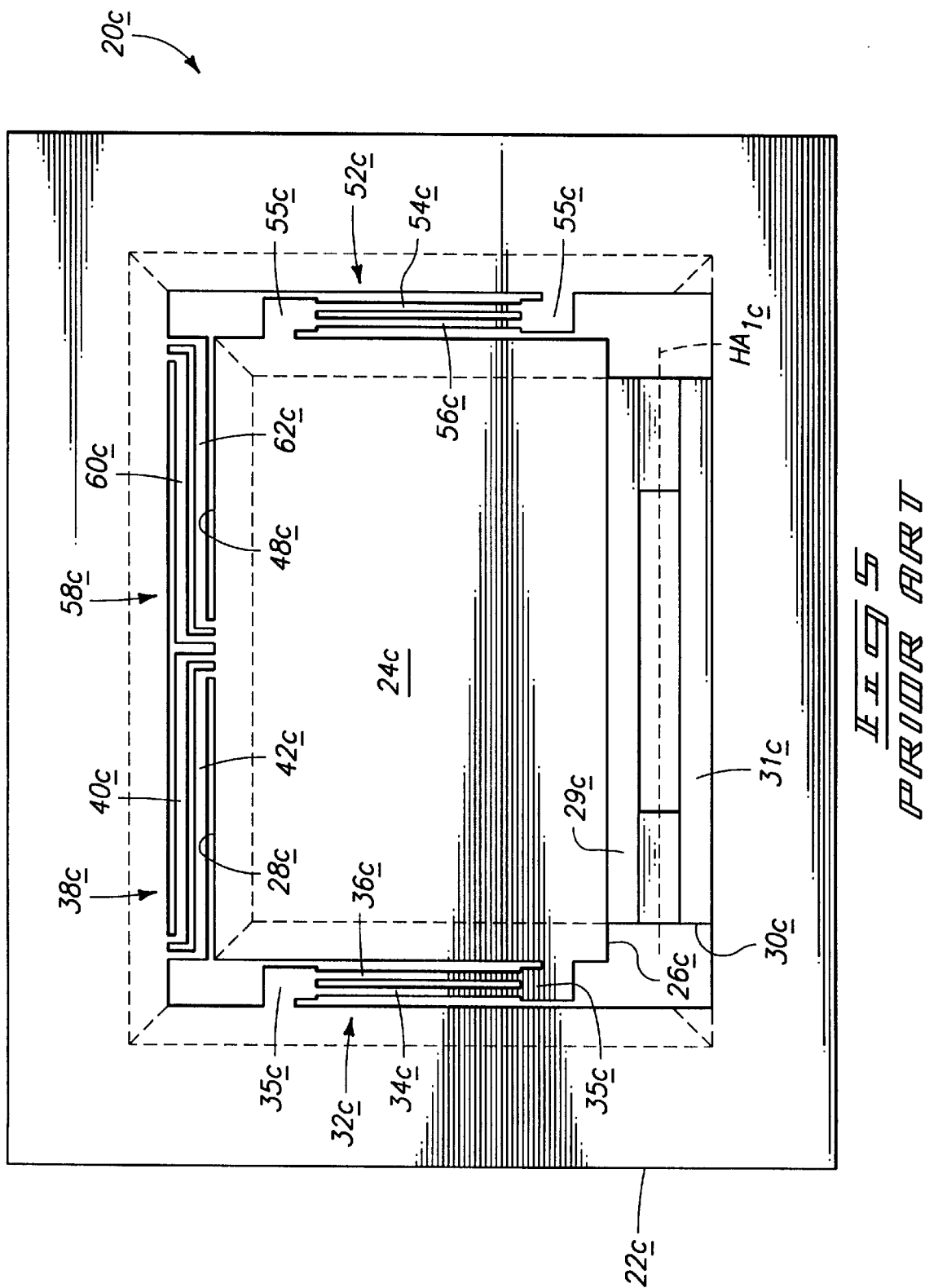
FIG. 5 is a top plan view of another known accelerometer.
Figure 6:
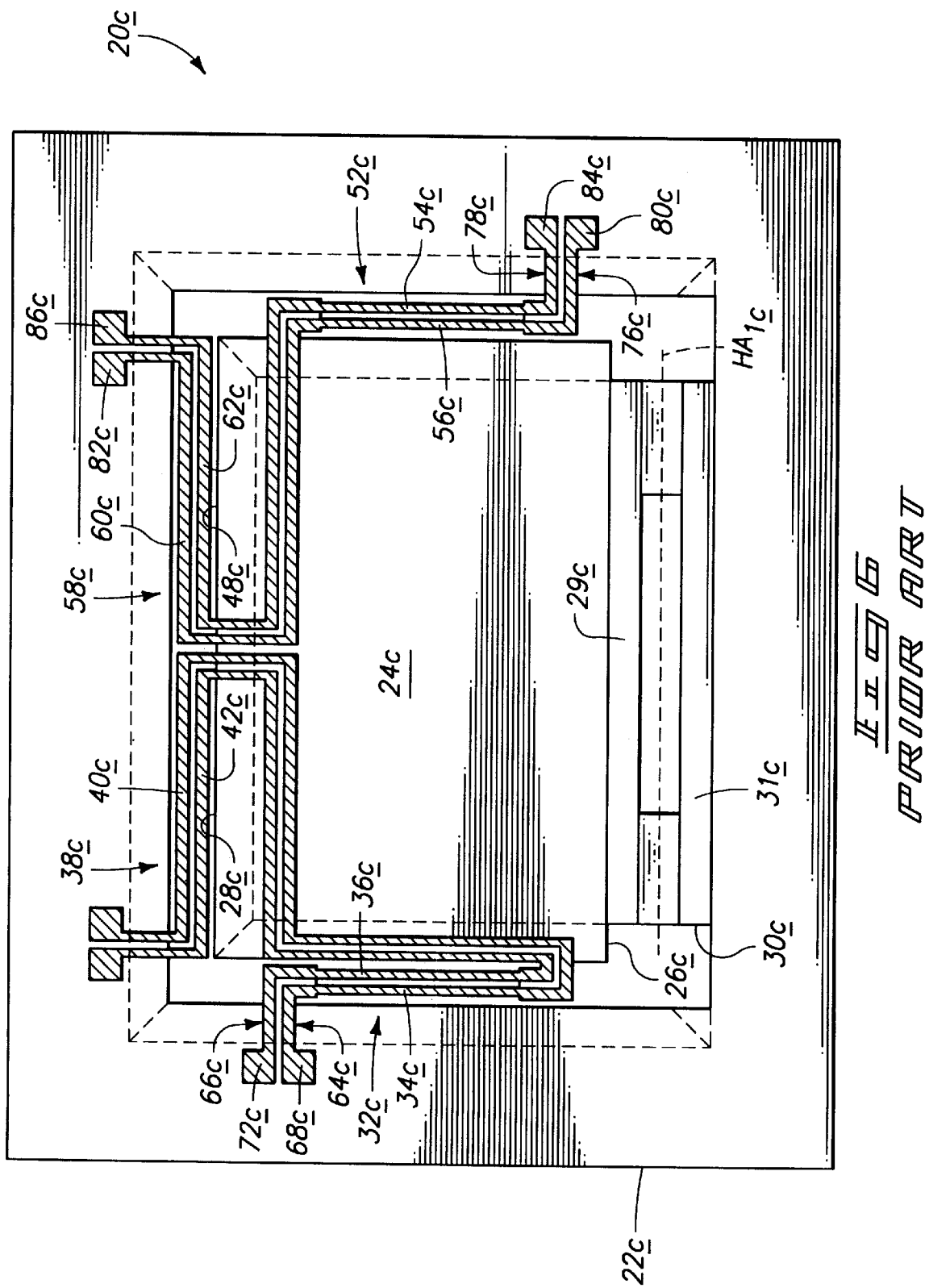
FIG. 6 is a top plan view of the FIG. 5 accelerometer with electrically conductive structure disposed thereon.
Figure 7:
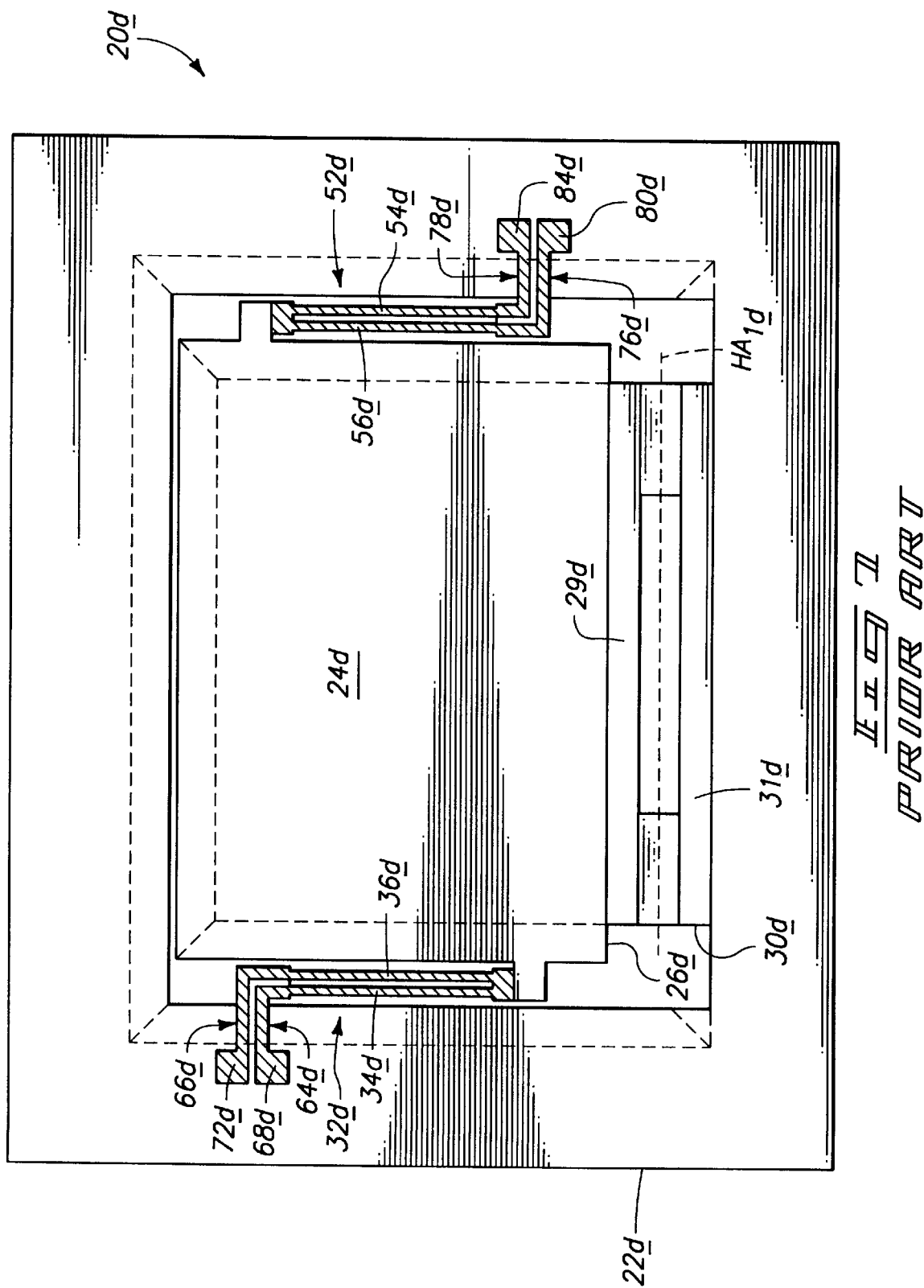
FIG. 7 is a top plan view of another known accelerometer.

FIG. 12 shows an implementation in which accelerometer 20h includes two proof masses 24h, 44h. Like numerals from the above-described embodiments have been utilized with the suffix "h". In the illustrated example, hinge axes $HA_{1h}$ and $HA_{2h}$ are disposed on a common side of frame 22h. It will be appreciated, however, that the proof masses could be formed with their associated hinge axis-defining flexures disposed oppositely one another as in FIG. 3. In that case, the corresponding strut assemblies would be disposed oppositely one another as well. In this example, the folded-back architecture is provided by both the vibrating beam assemblies and the strut assemblies. It is possible, however, for only one of the beam assemblies or the strut assemblies to provide the folded-back architecture. Moreover, it is possible for the struts to be eliminated from the two-proof mass implementations so that only the vibrating beam assemblies would provide the desired architecture. Further, the folded back architecture of the present invention could be incorporated into each of the embodiments described and illustrated in FIGS. 1–7.

The accelerometers described above can be fabricated through various silicon processing techniques. For example, the sloping surfaces or transition areas of the accelerometer can be formed through anisotropic etching of the silicon with, for example, potassium hydroxide. The flexures and vibrating beam assemblies can be formed from epitaxially grown silicon which is oppositely doped relative to the substrate. The epitaxial layers can be protected during etching through provision of a suitable voltage or back bias using known techniques. In another method, there is no epitaxial layer on the backside and the flexure is formed by etching from both sides of the wafer. This places the flexure closer to the center plane of the wafer so that the sensitive axis of the accelerometer is more nearly aligned generally normal to the front and back surfaces of the silicon. In yet another method, there are no epitaxial layers and the vibrating beam assemblies are etched from a silicon layer which is separated from the substrate by a thin, e.g. about 2 microns, layer of silicon oxide. For a detailed discussion of silicon processing techniques, reference is made to the following publications, which are incorporated herein by reference: *VLSI Fabrication Principles* by Sorab K. Ghandhi, and *Silicon Processing for the VLSI Era.*, Vols. 1–3, by S. Wolf & R. J. Tauber The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect. The invention is, therefore, to be interpreted in light of the appended claims appropriately interpreted in accordance with the doctrine of equivalents.

We claim:

1. An accelerometer comprising:

a frame;

a proof mass;

a flexure connected between the frame and the proof mass and defining a hinge axis about which the proof mass can be moved;

a vibrating beam structure connected between the frame and the proof mass;

electrically conductive structure supported over the vibrating beam structure and configured for connection to an external electrical circuit;

said electrically conductive structure defining a first conductive path having a pair of first conductive path portions being supported over said vibrating beam assembly and extending along individual lines which define a first set of lines which are generally parallel with one another;

said electrically conductive structure further defining a second conductive path having a pair of second conductive path portions being supported over said vibrating beam structure and extending along individual lines which define a second set of lines which are different from the first set of lines and generally parallel with one another;

a strut assembly connected between the frame and the proof mass;

wherein said first conductive path of said electrically conductive structure has another pair of first conductive path portions which are supported over the strut assembly and extend along individual lines which define a third set of lines which are generally parallel with one another; and said second conductive path of said electrically conductive structure has another pair of second conductive path portions which are supported over the strut assembly and extend along individual lines which define a fourth set of lines which are generally parallel with one another.

2. The accelerometer of claim 1, wherein the proof mass has a mounted end proximate the hinge axis and a distal end away from the mounted end and the strut assembly is disposed intermediate the distal end and the frame.

3. The accelerometer of claim 1, wherein the proof mass has a mounted end proximate the hinge axis and a distal end away from the mounted end and the strut assembly is disposed intermediate the mounted end and the frame.

4. The accelerometer of claim 1, wherein the first set of lines is generally parallel with the second set of lines.

5. The accelerometer of claim 1, wherein the third set of lines is generally parallel with the fourth set of lines.

6. The accelerometer of claim 1, wherein the first set of lines is generally perpendicular to the third set of lines.

7. The accelerometer of claim 1, wherein the fourth set of lines is generally perpendicular to the second set of lines.

8. The accelerometer of claim 1, wherein:

the vibrating beam assembly comprises a plurality of beams which are separated from one another and the strut assembly comprises a plurality of struts which are separated from one another;

the one pair of first conductive path portions are supported over different beams of the vibrating beam assembly;

the one pair of second conductive path portions are supported over beams which are different from both the beams over which the one pair of first conductive path portions are supported and each other;

the other of the pair of first conductive path portions are supported over a common strut; and the other of the pair of second conductive path portions are supported over a common strut which is different from the strut over which the other of the pair of first conductive path portions are supported.

9. An accelerometer comprising:

a frame;

a proof mass;

a flexure connected between the frame and the proof mass;

a vibrating beam assembly comprising a pair of vibratable beams and a pair of generally non-vibratable beams proximate the vibratable beams, said assembly being connected between the frame and the proof mass;

a first conductive path over the accelerometer and configured for connection to an external electrical circuit, said first conductive path comprising electrically conductive material disposed over and supported by one of the non-vibratable beams and one of the vibratable beams; and a second conductive path over the accelerometer and configured for connection to the external electrical circuit, said second conductive path comprising electrically conductive material disposed over and supported by the other of the non-vibratable beams and the other of the vibratable beams.

10. The accelerometer of claim 9 further comprising a strut assembly comprising a pair of struts connected between the frame and the proof mass, and wherein said first conductive path further comprises electrically conductive material disposed over and supported by one of the struts of the pair of struts, and wherein said second conductive path further comprises electrically conductive material disposed over and supported by the other strut of the pair of struts.

11. The accelerometer of claim 10, wherein said one of the struts of the pair of struts comprises first and second strut portions which are joined with one another and extend along respective lines which are generally parallel with one another, and said conductive material of said first conductive path is disposed over and supported by said first and second strut portions.

12. The accelerometer of claim 11, wherein said other strut of the pair of struts comprises third and fourth strut portions which are joined with one another and extend along respective different lines which are generally parallel with one another, and said conductive material of said second conductive path is disposed over and supported by said third and fourth strut portions.

13. The accelerometer of claim 10, wherein:

the proof mass comprises a mounted end proximate the flexure and a distal end opposite the mounted end; and the strut assembly is disposed intermediate the mounted end and the frame.

14. An accelerometer comprising:

a frame;

a proof mass;

a flexure connected between the frame and the proof mass and defining an axis about which the proof mass can be moved;

a vibrating beam assembly connected between the frame and the proof mass and comprising a plurality of beams at least some of which being vibratable, others of which being generally non-vibratable;

a pair of spaced-apart first bond pads positioned over the frame;

a first conductive path joining with and extending between the first bond pads, said first conductive path comprising electrically conductive material disposed over and supported by one non-vibratable beam and one vibratable beam, said first conductive path having individual first path portions over said respective beams which extend from a respective one of the first bond pads to the other of the first bond pads in generally opposite directions relative to one another;

a pair of spaced-apart second bond pads positioned over the frame; and a second conductive path joining with and extending between the second bond pads, said second conductive path comprising electrically conductive material disposed over and supported by a different non-vibratable beam and a different vibratable beam, said second conductive path having individual second path portions over said respective different beams which extend from a respective one of the second bond pads to the other of the second bond pads in generally opposite directions relative to one another.

15. The accelerometer of claim 14 further comprising a strut assembly having first and second struts which are joined with and extend between the proof mass and the frame, said first conductive path comprising a different first path portion disposed over and supported by said first strut; and said second conductive path comprising a different second path portion disposed over and supported by said second strut.

16. The accelerometer of claim 14 further comprising a strut assembly having first and second elongate struts which are joined with and extend along respective first and second longitudinal axes between the proof mass and the frame, said first strut having first strut portions which extend from the proof mass to the frame in directions which are generally opposite one another, said second strut having second strut portions which extend from the proof mass to the frame in directions which are generally opposite one another;

said first conductive path comprising a different first path portion disposed over and supported by said first strut; and said second conductive path comprising a different second path portion disposed over and supported by said second strut.

17. The accelerometer of claim 14, wherein the second path portions are disposed laterally proximate the first path portions.

18. The accelerometer of claim 14, wherein one of the first and second path portions is disposed laterally inward of the other of the first and second path portions.

19. The accelerometer of claim 14, further comprising a strut assembly having first and second struts which are joined with and extend between the proof mass and the frame, said first conductive path comprising a different first path portion disposed over and supported by said first strut;

said second conductive path comprising a different second path portion disposed over and supported by said second strut; and said proof mass comprises a mounted end proximate the flexure and a distal end opposite the flexure, said strut assembly being disposed intermediate the distal end of the proof mass and the frame.

20. The accelerometer of claim 14, further comprising a strut assembly having first and second struts which are joined with and extend between the proof mass and the frame, said first conductive path comprising a different first path portion disposed over and supported by said first strut;

said second conductive path comprising a different second path portion disposed over and supported by said second strut; and said proof mass comprises a mounted end proximate the flexure and a distal end opposite the flexure, said strut assembly being disposed intermediate the mounted end of the proof mass and the frame.

21. The accelerometer of claim 14, wherein the pairs of first and second bond pads are supported over the frame on one side of the axis defined by the flexure.

22. The accelerometer of claim 14, wherein one of the bond pads of each of the first and second pairs of bond pads is supported over the frame on one side of the axis defined by the flexure, and the other of the bond pads of each of the first and second pairs of bond pads is supported over the frame on another side of said axis.

23. An accelerometer comprising:

a frame;

a first proof mass;

a first flexure connected between the frame and the first proof mass and defining a first hinge axis about which the first proof mass can be moved;

a first vibrating beam structure connected between the frame and the first proof mass;

a first strut assembly connected between the frame and the first proof mass;

a second proof mass;

a second flexure connected between the frame and the second proof mass and defining a second hinge axis about which the second proof mass can be moved;

a second vibrating beam structure connected between the frame and the second proof mass;

a second strut assembly connected between the frame and the second proof mass; and electrically conductive structure supported over the first and second vibrating beam assemblies and the first and second strut assemblies and configured for connection to an external electrical circuit, said electrically conductive structure defining a first conductive path having two pairs of first conductive path portions, one of the pair of first conductive path portions being supported over said first vibrating beam assembly and extending along individual lines which define a first set of lines which are generally parallel with one another, the other of the pair of first conductive path portions being supported over said first strut assembly and extending along individual lines which define a second set of lines which are generally parallel with one another, said electrically conductive structure further defining a second conductive path having two pairs of second conductive path portions, one of the pair of second conductive path portions being supported over said first vibrating beam assembly and extending along individual lines which define a third set of lines which are generally parallel with one another, the other of the pair of second conductive path portions being supported over said first strut assembly and extending along individual lines which define a fourth set of lines which are generally parallel with one another, said electrically conductive structure further defining a third conductive path having two pairs of third conductive path portions, one of the pair of third conductive path portions being supported over said second vibrating beam assembly and extending along individual lines which define a fifth set of lines which are generally parallel with one another, the other of the pair of third conductive path portions being supported over said second strut assembly and extending along individual lines which define a sixth set of lines which are generally parallel with one another, said electrically conductive structure further defining a fourth conductive path having two pairs of fourth conductive path portions, one of the pair of fourth conductive path portions being supported over said second vibrating beam assembly and extending along individual lines which define a seventh set of lines which are generally parallel with one another, the other of the pair of fourth conductive path portions being supported over said second strut assembly and extending along individual lines which define a eighth set of lines which are generally parallel with one another.

24. The accelerometer of claim 23, wherein:

the first proof mass has a first mounted end proximate the first hinge axis and a first distal end away from the first mounted end, and the first strut assembly is disposed intermediate the first distal end and the frame; and the second proof mass has a second mounted end proximate the second hinge axis and a second distal end away from the second mounted end, and the second strut assembly is disposed intermediate the second distal end and the frame.

25. The accelerometer of claim 23, wherein:

the first proof mass has a first mounted end proximate the first hinge axis and a first distal end away from the first mounted end, and the first strut assembly is disposed intermediate the first mounted end and the frame; and the second proof mass has a second mounted end proximate the second hinge axis and a second distal end away from the second mounted end, and the second strut assembly is disposed intermediate the second mounted end and the frame.

26. The accelerometer of claim 23, wherein first, third, fifth, and seventh sets of lines are generally parallel with one another.

27. The accelerometer of claim 23, wherein second, fourth, sixth, and eighth sets of lines are generally parallel with one another.

28. The accelerometer of claim 23, wherein the first and second hinge axes are disposed on a common side of the frame.

29. A method of forming an accelerometer comprising:

providing a silicon substrate;

providing a frame within the substrate;

providing a proof mass within the substrate;

providing a flexure connected between the frame and the proof mass;

providing a vibrating beam assembly comprising a pair of vibratable beams and a pair of generally non-vibratable beams proximate the vibratable beams, said assembly being connected between the frame and the proof mass;

forming a first conductive path over the accelerometer and configured for connection to an external electrical circuit, said first conductive path comprising electrically conductive material disposed over and supported by one of the non-vibratable beams and one of the vibratable beams; and forming a second conductive path over the accelerometer and configured for connection to the external electrical circuit, said second conductive path comprising electrically conductive material disposed over and supported by the other of the non-vibratable beams and the other of the vibratable beams.

30. The method of claim 29, further comprising the step of providing a strut assembly comprising a pair of struts connected between the frame and the proof mass;

forming said first conductive path of electrically conductive material disposed over and supported one of the struts of the pair of struts; and forming said second conductive path of electrically conductive material disposed over and supported by the other strut of the pair of struts.

31. A method of forming an accelerometer comprising:

providing a silicon substrate;

providing a frame within the substrate;

providing a proof mass within the substrate;

providing a flexure connected between the frame and the proof mass and defining an axis about which the proof mass can be moved;

providing a vibrating beam assembly connected between the frame and the proof mass and comprising a plurality of beams at least some of which being vibratable, others of which being generally non-vibratable;

forming a pair of spaced-apart first bond pads positioned over the frame;

forming a first conductive path joining with and extending between the first bond pads, said first conductive path comprising electrically conductive material disposed over and supported by one non-vibratable beam and one vibratable beam, said first conductive path having individual first path portions over said respective beams which extend from a respective one of the first bond pads to the other of the first bond pads in generally opposite directions relative to one another;

forming a pair of spaced-apart second bond pads positioned over the frame; and forming a second conductive path joining with and extending between the second bond pads, said second conductive path comprising electrically conductive material disposed over and supported by a different non-vibratable beam and a different vibratable beam, said second conductive path having individual second path portions over said respective different beams which extend from a respective one of the second bond pads to the other of the second bond pads in generally opposite directions relative to one another.

\* \* \* \* \*